(12) United States Patent
Ahn et al.

(10) Patent No.: US 10,721,437 B2
(45) Date of Patent: *Jul. 21, 2020

(54) TERMINAL AND SERVER FOR PROVIDING VIDEO CALL SERVICE

(71) Applicant: HYPERCONNECT, INC., Seoul (KR)

(72) Inventors: Sang Il Ahn, Chungcheongbuk-do (KR); Hyeok Choi, Seoul (KR)

(73) Assignee: HYPERCONNECT, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,371

(22) Filed: Nov. 27, 2019

(65) Prior Publication Data

US 2020/0099888 A1 Mar. 26, 2020

Related U.S. Application Data

(63) Continuation of application No. 16/223,528, filed on Dec. 18, 2018, now Pat. No. 10,531,042.

(30) Foreign Application Priority Data

Dec. 27, 2017 (KR) .......................... 10-2017-0181519

(51) Int. Cl.
*H04N 7/14* (2006.01)
*H04N 5/44* (2011.01)
*H04L 29/06* (2006.01)
*H04N 5/232* (2006.01)

(52) U.S. Cl.
CPC ......... *H04N 7/147* (2013.01); *H04L 65/1069* (2013.01); *H04N 5/232941* (2018.08); *H04N 5/4403* (2013.01); *H04N 2005/443* (2013.01)

(58) Field of Classification Search
CPC ....................................................... H04N 7/14
See application file for complete search history.

(56) References Cited

U.S. PATENT DOCUMENTS 8,977,063 B2* 3/2015 Lee .......................... H04N 7/147
348/14.08
2016/0019412 A1* 1/2016 Kang ..................... H04N 5/232
382/103

* cited by examiner

*Primary Examiner* — Olisa Anwah
(74) *Attorney, Agent, or Firm* — Marshall, Gerstein & Borun LLP

(57) ABSTRACT

There is provided an application stored in a computer-readable storage medium and enabling a first terminal to perform a method of providing a video call service, the method includes: establishing a video call session between the first terminal and a second terminal; displaying an exposure control area for controlling an exposure area of an image of a first user displayed on the second terminal; receiving an input of the first user for controlling the exposure control area; and transmitting a signal for controlling the exposure area to the second terminal in response to the input of the first user.

17 Claims, 10 Drawing Sheets

TERMINAL AND SERVER FOR PROVIDING VIDEO CALL SERVICE

CROSS-REFERENCE TO RELATED APPLICATION

The present application is a continuation of U.S. patent application Ser. No. 16/223,528, filed Dec. 18, 2018, which claims the benefit of Korean Patent Application No. 10-2017-0181519, filed on Dec. 27, 2017, in the Korean Intellectual Property Office, the disclosure of which is incorporated herein in its entirety by reference.

BACKGROUND

1. Field

One or more embodiments relate to a terminal and server for providing a video call service, in which an exposure range of an image may be adjusted according to control of a user.

2. Description of the Related Art

With the development of wireless communication technology, a large amount of data is able to be transmitted at a high speed, and accordingly, not only a voice call service, but also a video call service have been actively provided.

The video call service denotes a call service in which voice signals and image signals are exchanged between a plurality of terminals. Accordingly, when a video call starts in a terminal, an image including a user's face is obtained by driving a camera and is transmitted to another terminal.

Such video calls are advantageous in that users who are far away can talk to each other face to face, but may be problematic in terms of privacy. In other words, when a user receives a video call while the user does not want to show his/her entire face or does not want to expose his/her privacy through a surrounding environment in an image, the user may be put into a difficult position.

SUMMARY

One or more embodiments include a method and user terminal for exposing a user image as much as a user wants in another terminal.

Additional aspects will be set forth in part in the description which follows and, in part, will be apparent from the description, or may be learned by practice of the presented embodiments.

According to one or more embodiments, a method, performed by a server, of providing a video call service, the method includes: establishing a video call session between the first terminal and a second terminal; displaying an exposure control area for controlling an exposure area of an image of a first user displayed on the second terminal; receiving an input of the first user for controlling the exposure control area; and transmitting a signal for controlling the exposure area to the second terminal in response to the input of the first user.

According to one or more embodiments, an application stored in a computer-readable storage medium and enabling a first terminal to perform a method of providing a video call service, the method includes: establishing a video call session between the first terminal and a second terminal; displaying an exposure control area for controlling an exposure area of an image of a first user displayed on the second terminal; receiving an input of the first user for controlling the exposure control area; and transmitting a signal for controlling the exposure area to the second terminal in response to the input of the first user.

According to one or more embodiments, a server for providing a video call service, the server includes: a communication interface configured to communicate with a terminal for providing a video call service; a storage unit; a processor; and a memory storing instructions executable by the processor, wherein the processor is configured to execute the instructions to: establish a video call session between the first terminal and a second terminal; display, on the first terminal, an exposure control area for controlling an exposure area of an image of a first user displayed on the second terminal; receive an input of the first user for controlling the exposure control area from the first terminal; and transmit a signal for controlling the exposure area to the second terminal in response to the input of the first user.

According to one or more embodiments, a non-transitory computer-readable recording medium storing instructions executable by a processor, the computer-readable storage medium includes: instructions to establish a video call session between a first terminal and a second terminal; instructions to display, on the first terminal, an exposure control area for controlling an exposure area of an image of a first user displayed on the second terminal; instructions to receive an input of the first user for controlling the exposure control area from the first terminal; and instructions to transmit a signal for controlling the exposure area to the second terminal in response to the input of the first user.

According to one or more embodiments, a user terminal includes: a camera configured to obtain a user image; a communication interface configured to communicate with a server and another user terminal; a processor; and a memory storing instructions executable by the processor, wherein the processor is configured to execute the instructions to: establish a video call session with the other user terminal; display, on the user terminal, an exposure control area for controlling an exposure area of a user image displayed on the other user terminal; receive a user input for controlling the exposure control area; and transmit a signal for controlling the exposure area to the other user terminal in response to the user input.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
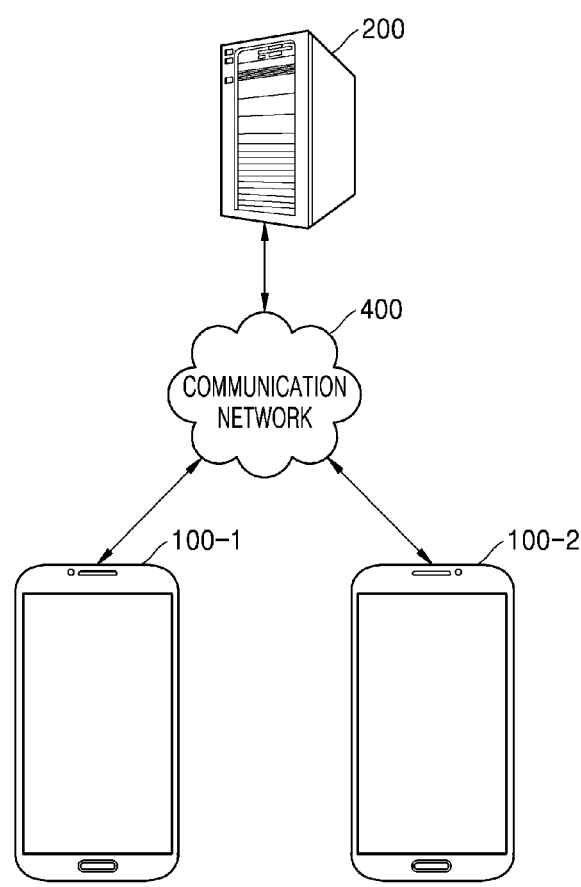
FIG. 1 is a diagram for describing an environment in which a video call service is provided.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

FIG. 1 is a diagram for describing an environment in which a video call service is provided.

A video call service denotes a service in which a plurality of users communicate with each other by exchanging their images with each other by using their respective terminals. Users using the video call service may exchange an image and voice via respective terminals and may exchange text via a chat function. A user may use the video call service with another party directly designated by him/herself or designated by a server for providing the video call service randomly or in a certain manner.

Referring to FIG. 1, a first terminal 100-1 and a second terminal 100-2 are connected to a server 200 for providing a video call service via a communication network 400. The server 200 may store various programs or applications and data, which enable a plurality of users to use the video call service by using the first and second terminals 100-1 and 100-2. The server 200 for providing the video call service may perform both short-distance communication and remote communication. The server 200 providing the video call service may be connected to the first and second terminals 100-1 and 100-2 via the communication network 400. The first and second terminals 100-1 and 100-2 may be any type of terminal connectable to the server 200. For example, the first and second terminals 100-1 and 100-2 may be a device capable of communicating with the server 200, and may be a wearable device such as a smart watch, a mobile device such as a smart phone, a tablet personal computer (PC), or a laptop computer, or a stationary device such as a desktop computer. Also, the first and second terminals 100-1 and 100-2 may be video call devices providing a video call service, in which images may be captured and reproduced such that users connected via the video call service are able to make a video call.

According to an embodiment, an "exposure area" denotes an area where a user is able to view an image through a terminal when a video call session is established and a video call screen is displayed on the terminal. For example, an exposure area may indicate a part of an image stream obtained by capturing an image of a user displayed on a screen of a terminal. According to an embodiment, when a size of an exposure area increases, a range of a user's body visible through a terminal may be increased. In other words, a second user is able to view an image of a first user only through a first exposure area on a screen of a second terminal. Also, the first user is able to view an image of the second user only through a second exposure area on a screen of a first terminal.

According to an embodiment, a "non-exposure area" denotes an image area excluding an exposure area from a video call screen displayed on a terminal. For example, in a user image displayed on a screen of a terminal, a non-exposure area may be displayed by using means for hiding the user image, such as a mosaic, shading adjustment, or background insertion. In other words, a user is unable to view the other party or a surrounding environment from an image corresponding to a non-exposure area. According to an embodiment, the sum of sizes of an exposure area and a non-exposure area may be equal to a size of an image of the other party.

According to an embodiment, an "exposure control area" denotes a virtual area for controlling an exposure area. For example, a first user may control a second exposure control area of a first terminal to control a first exposure area of an image of the first user on a second terminal.

According to an embodiment, "dragging" denotes an operation of a user contacting a screen with a finger or a touch tool and then moving the finger or the touch tool to another location in the screen while maintaining the contact. Via dragging, an object (for example, an image included in a thumbnail image) may be moved, or panning, in which dragging is performed without selecting an object by a user, may be performed.

According to an embodiment "pinching" denotes an operation of a user touching a screen with two fingers, and then moving the fingers in different directions. Pinching is a gesture to pinch-open or pinch-close an object or page, and an enlargement value or a reduction value may be determined based on a distance between two fingers.

Figure 2:
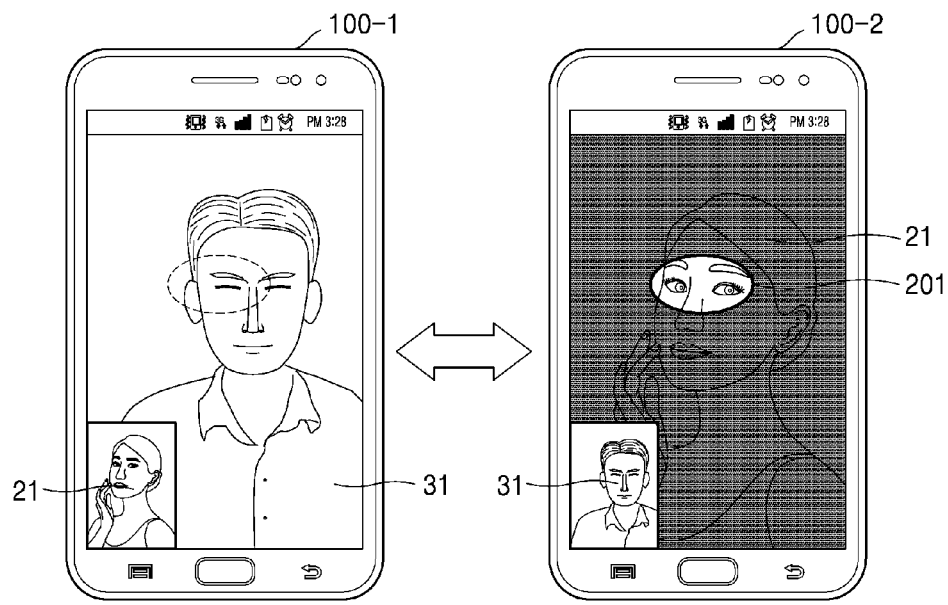
FIG. 2 is a diagram for describing a video call screen providing an exposure area and a non-exposure area, according to an embodiment.

FIG. 2 is a diagram for describing a video call screen providing an exposure area 201 and a non-exposure area, according to an embodiment.

According to an embodiment, when a video call session is established with the second terminal 100-2, the first terminal 100-1 may display a video call screen. According to an embodiment, the first terminal 100-1 may display an image stream obtained by capturing an image of a first user 21 or an image stream obtained by capturing an image of a second user 31 received from the second terminal 100-2.

Also, when a video call session is established with the first terminal 100-1, the second terminal 100-2 may display an image stream obtained by capturing an image of the second user 31 or an image stream obtained by capturing an image of the first user 21 received from the first terminal 100-1.

According to an embodiment, the first terminal 100-1 may set the exposure area 201 of the image of a first user 21 such that only a part of the image of the first user 21 is displayed on the second terminal 100-2. In other words, the first terminal 100-1 may set the exposure area 201 of the image of a first user 21 such that the second user 31 is able to view only the exposure area 201 among the image of the first user 21 displayed on the second terminal 100-2.

According to an embodiment, the exposure area 201 may be set by the first user 21 or according to setting information pre-designated by a server.

According to an embodiment, the second user 31 of the second terminal 100-2 is able to view only a figure of the first user 21 located in the exposure area 201. For example, when eyes of the first user 21 are located at the exposure area 201, the second user 31 is able to view only the eyes of the first user 21. Accordingly, privacy of the first user 21 may be maintained.

According to an embodiment, the location of the exposure area 201 may be pre-set by the first user 21. For example, the center of the image of the first user 21 obtained through a camera of the first terminal 100-1 may be set as the exposure area 201.

According to another embodiment, the exposure area 201 may track a body part of the first user 21. For example, when the first user 21 sets the exposure area 201 to track a location of the eyes of the first user 21, the exposure area 201 may move along the locations of the eyes of the first user 21 even when the first user 21 moves. Accordingly, the first user 21 may avoid expose of a body part that the first user 21 does not wish to expose.

According to an embodiment, the first terminal 100-1 may transmit, to the second terminal 100-2, a signal for changing an attribute of a non-exposure area excluding the exposure area 201. For example, an attribute of a background screen color, a pattern, or an effect of the non-exposure area may be changed. The second terminal 100-2 may change the attribute of the non-exposure area based on the signal received from the first terminal 100-1.

According to an embodiment, the first terminal 100-1 may control an attribute of a voice signal of a video call service output through the second terminal 100-2. According to an embodiment, the voice of the first user 21 output to the second terminal 100-2 may be controlled when the first terminal 100-1 performs voice modulation, muting, volume adjustment on the voice of the first user 21.

According to an embodiment, the first terminal 100-1 may control a voice signal received through the first terminal 100-1. For example, the first terminal 100-1 may control a voice attribute, for example, volume or voice modulation, of the received voice signal, and then transmit the voice signal to the second terminal 100-2.

Figure 3:
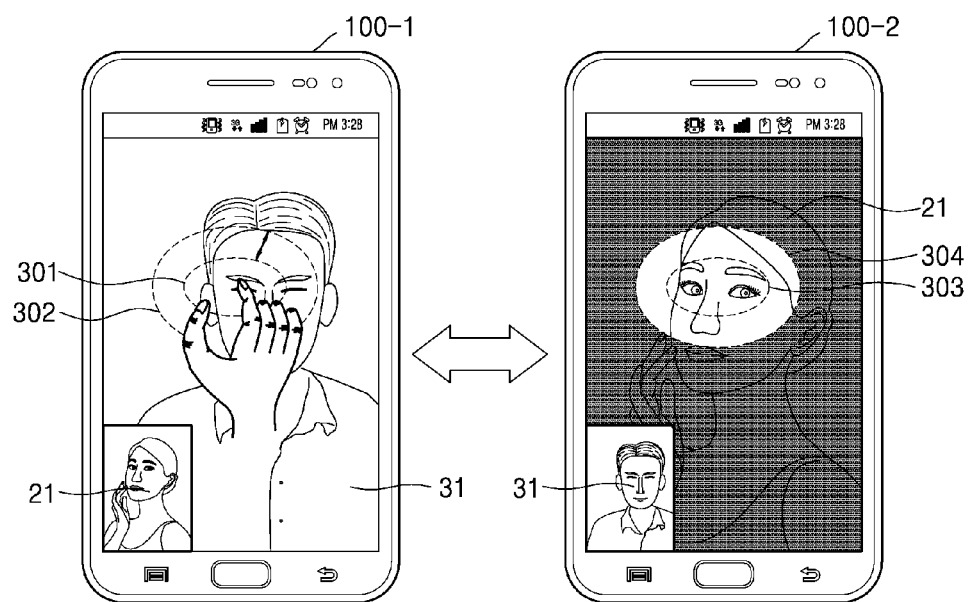
FIG. 3 is a diagram for describing controlling of a size of an exposure area of an image of a first user displayed on a second terminal according to an input of the first user, according to an embodiment.

FIG. 3 is a diagram for describing controlling of a size of an exposure area 303 of an image of the first user 21 displayed on the second terminal 100-2 according to an input of the first user 21, according to an embodiment.

According to an embodiment, the image of the first user 21 is viewable on the second terminal 100-2 only through the exposure area 303. According to an embodiment, the exposure area 303 may have a size corresponding to a size of an exposure control area 301.

According to an embodiment, the first terminal 100-1 may receive an input of the first user 21 for controlling the exposure control area 301. According to an embodiment, the exposure control area 301 may be always displayed on a video call screen of the first terminal 100-1. According to an embodiment, the exposure control area 301 may include a shape, such as a figure, an icon, a button, or an arrow.

Alternatively, the exposure control area 301 may not be displayed on the video call screen, but may be displayed upon a request of the first user 21. According to an embodiment, a shape of the exposure control area 301 in an invisible state may be visualized in a circular shape, according to a request of the first user 21 to display the exposure control area 301.

According to an embodiment, the first user 21 may change the size of the exposure control area 301 to an exposure control area 302. Upon changing the size of the exposure control area 301 to the exposure control area 302, a signal for controlling a size of the exposure area 303 of the second terminal 100-2 may be generated. Here, the signal for controlling the size of the exposure area 303 of the second terminal 100-2 may be generated by the first terminal 100-1 or the server. The first terminal 100-1 or the server may transmit the signal for controlling the exposure area 303 to the second terminal 100-2.

An exposure area 304 obtained by changing the size of the exposure area 303 may be displayed on the second terminal 100-2 in response to the exposure control area 302 by the first user 21. Accordingly, the second user 31 may view the image of the first user 21 through the exposure area 304. In other words, the second user 31 is able to view a wider range of the image of the first user 21 through the exposure area 304.

Figure 4:
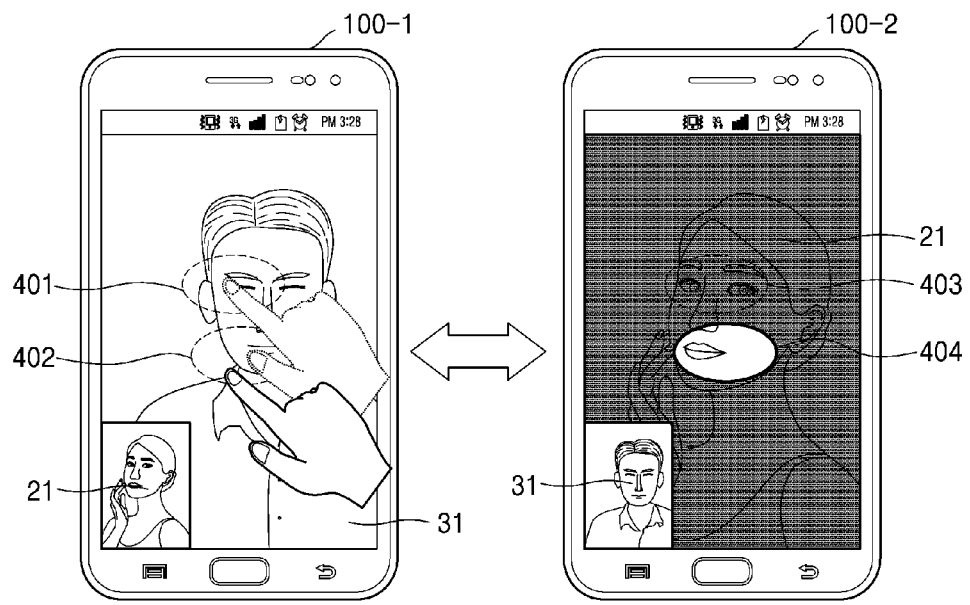
FIG. 4 is a diagram for describing controlling of a location of an exposure area of an image of a first user displayed on a second terminal according to an input of the first user, according to an embodiment.

FIG. 4 is a diagram for describing controlling of a location of an exposure area 403 of an image of the first user 21 displayed on the second terminal 100-2 according to an input of the first user 21, according to an embodiment.

According to an embodiment, the first user 21 may move the location of the exposure area 403 in the second terminal 100-2 by moving a location of an exposure control area 401 to an exposure control area 402.

According to an embodiment, when the first user 21 changes the location of the exposure control area 401 to the exposure control area 402, the first terminal 100-1 may generate a signal for controlling the location of the exposure area 403 according to the exposure control area 402. The first terminal 100-1 may transmit the signal for controlling the location of the exposure area 403 to the second terminal 100-2 directly or via the server.

According to an embodiment, the second terminal 100-2 may display an exposure area 404 obtained by changing the location of the exposure area 403 according to the signal for controlling the location of the exposure area 403. According to an embodiment, the second terminal 100-2 may display the image of the first user 21 only in the exposure area 404.

Figure 5:
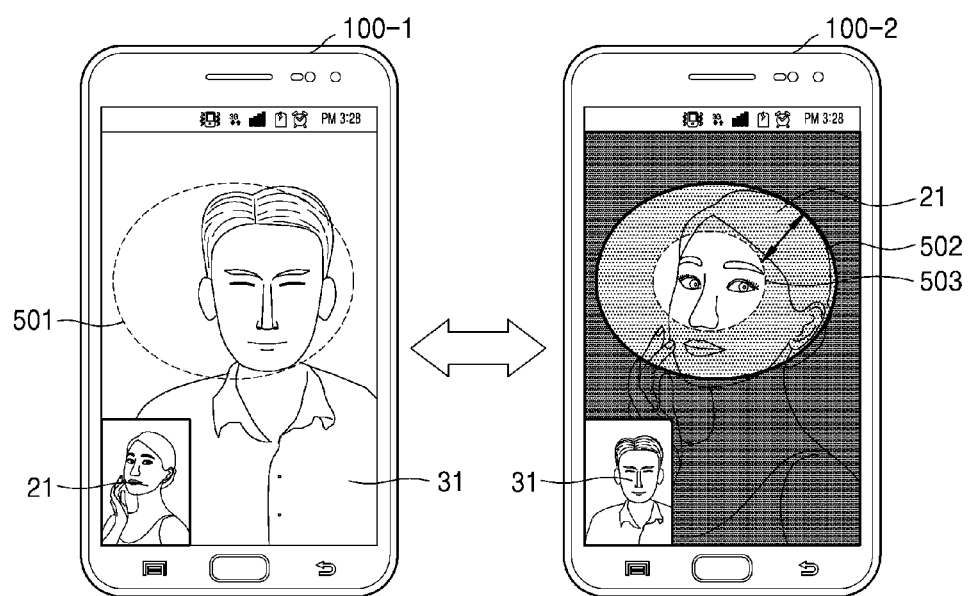
FIG. 5 is a diagram for describing controlling of an exposure area according to an input of a second user within a maximum exposure area of an image of a first user displayed on a second terminal, according to an embodiment.

FIG. 5 is a diagram for describing controlling of an exposure area 503 according to an input of the second user 31 within a maximum exposure area 502 of an image of the first user 21 displayed on the second terminal 100-2, according to an embodiment.

According to an embodiment, the second terminal 100-2 may adjust the exposure area 503 within the maximum exposure area 502 set in an exposure control area 501 received from the first terminal 100-1.

According to an embodiment, the first terminal 100-1 may control the exposure control area 501 according to an input of the first user 21 to set a maximum size of the exposure control area 501. The first terminal 100-1 may generate a signal for setting the maximum exposure area 502 corresponding to the maximum size of the exposure control area 501. The first terminal 100-1 may transmit the signal for setting the maximum exposure area 502 to the second terminal 100-2 directly or via the server.

The second terminal 100-2 may display the maximum exposure area 502. According to an embodiment, the maximum exposure area 502 may be displayed in a shape set by the first user 21. For example, the maximum exposure area 502 may be displayed in a circle of a thick solid line.

According to an embodiment, the second terminal 100-2 may distinguishably display the exposure area 502 and the maximum exposure area 502. For example, the exposure area 503 may be displayed in a broken line and the maximum exposure area 502 may be displayed in a solid line, but are not limited thereto.

According to an embodiment, the image of the first user 21 is viewed only through the exposure area 503 in the second terminal 100-2. According to an embodiment, a region between the exposure area 503 and the maximum exposure area 502 may be a semi-transparent region. For example, the semi-transparent region may be a state more modulated than the exposure area 503 but less modulated than a non-exposure area. Accordingly, the second user 31 may visually check a range for adjusting the exposure area 503 through the semi-transparent region.

Figure 6:
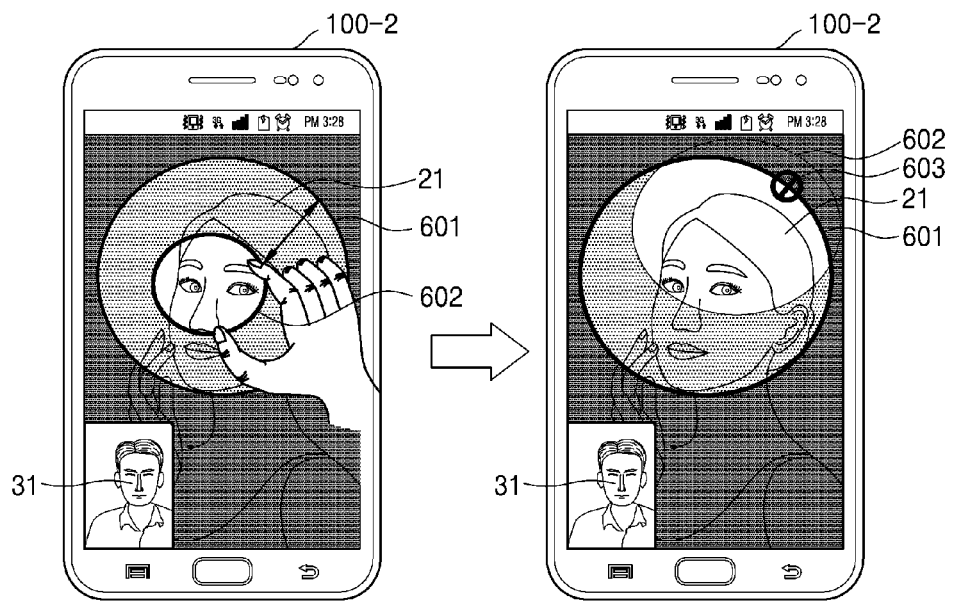
FIG. 6 is a diagram for describing controlling in an unacceptable range when an exposure area is controlled according to an input of a second user, according to an embodiment.

FIG. 6 is a diagram for describing controlling in an unacceptable range when an exposure area 602 is controlled according to an input of the second user 31, according to an embodiment.

According to an embodiment, the second user 31 may control the exposure area 602 within a maximum exposure area 601. According to an embodiment, the second user 31 may adjust the size or location of the exposure area 602 via a pinching input or a dragging input.

According to an embodiment, the second terminal 100-2 may display the maximum exposure area 601 after changing an attribute thereof while the second user 31 adjusts the size or location of the exposure area 602. For example, the second terminal 100-2 may change the attribute of the maximum exposure area 601, such as a color, thickness, flickering, brightness, or the like of an outline of a figure displaying the maximum exposure area 601. Alternatively, the second terminal 100-2 may change an attribute of a region between the exposure area 602 and the maximum exposure area 601.

According to an embodiment, when an input for controlling the exposure area 602 outside the maximum exposure area 601 is received, the second terminal 100-2 may display a warning message. For example, the second terminal 100-2 may display an icon 603 indicating that the size and location of the exposure area 602 are no more adjustable. The second terminal 100-2 may also indicate that the size and location of the exposure area 602 are not adjustable via a visual notification using a popup window, a vibration notification, or a voice notification.

Also, when the exposure area 602 is outside the maximum exposure area 601, the second terminal 100-2 does not display the image of the first user 21 in the exposure area 602, which exceeds the maximum exposure area 601.

Accordingly, the second terminal 100-2 may only display the image of the first user 21 only in a region determined by the first user 21.

According to another embodiment, the maximum exposure area 601 may be pre-determined by the server. The same operations as described with reference to FIGS. 5 and 6 are performed even when the maximum exposure area 601 is determined by the server.

Figure 7:
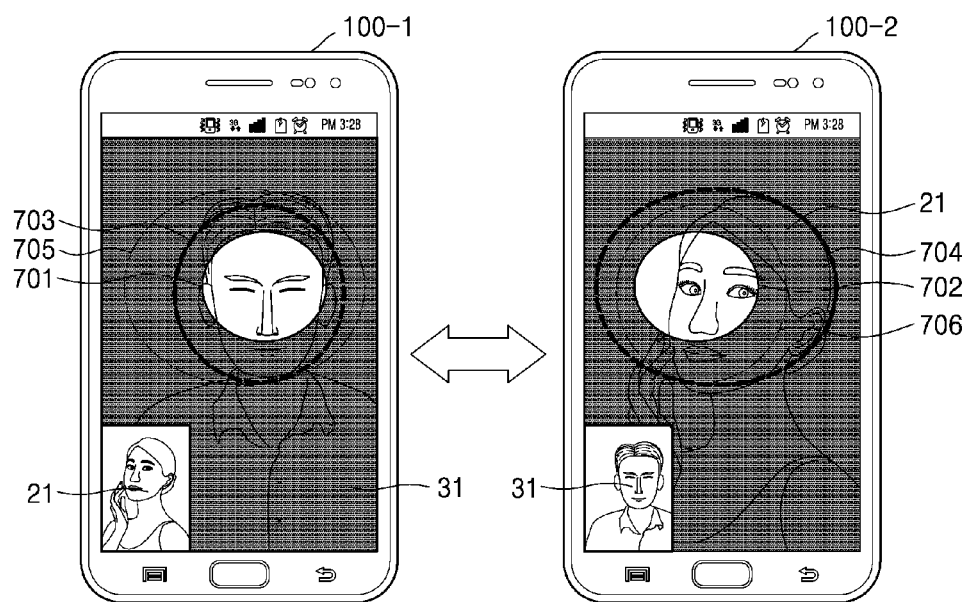
FIG. 7 is a diagram for describing controlling of exposure control areas of a first user and a second user, according to an embodiment.

FIG. 7 is a diagram for describing controlling of first and second exposure control areas 703 and 704 of the first user 21 and the second user 31, according to an embodiment.

In FIGS. 2 through 6, controlling of an exposure area by the first user 21 has been described, but in FIGS. 7 and 9, controlling of an exposure area by both parties will be described.

According to an embodiment, the first user 21 of the first terminal 100-1 may view an image of the second user 31 through a pre-set second exposure area 701. Also, the second user 31 of the second terminal 100-2 may view an image of the first user 21 through a pre-set first exposure area 702.

According to an embodiment, the first terminal 100-1 may display the first exposure control area 703 controlled by the first user 21. The first terminal 100-1 may determine a maximum first exposure area 706 by controlling a size or location of the first exposure control area 703.

According to an embodiment, the first terminal 100-1 may display a maximum second exposure area 705 controlled by the second terminal 100-2. The first terminal 100-1 is unable to control the maximum second exposure area 705, but only visually displays the maximum second exposure area 705.

According to an embodiment, the second terminal 100-2 may display the second exposure control area 704 controlled by the second user 31. The second terminal 100-2 may determine the maximum second exposure area 705 by controlling a size or location of the second exposure control area 704. According to an embodiment, information about the maximum second exposure area 705 determined by the second terminal 100-2 may be transmitted to the first terminal 100-1 directly or via the server, and be transmitted to the server.

According to an embodiment, the second terminal 100-2 may display the maximum first exposure area 706 controlled by the first terminal 100-1. The second terminal 100-2 is unable to control the maximum first exposure area 706, but only visually displays the maximum first exposure area 706.

According to an embodiment, the first terminal 100-1 may compare the first exposure control area 703 and the maximum second exposure area 705. According to an embodiment, the first terminal 100-1 may determine, as a maximum size of a controllable exposure area, one of the first exposure control area 703 and the maximum second exposure area 705, which has a smaller size. For example, since the first exposure control area 703 has a size smaller than the maximum second exposure area 705, the size of the first exposure control area 703 may be determined as a maximum size for adjusting the second exposure area 701.

Similarly, the second terminal 100-2 may determine the size of the maximum first exposure area 706 as a maximum size for adjusting the first exposure area 702.

Figure 8:
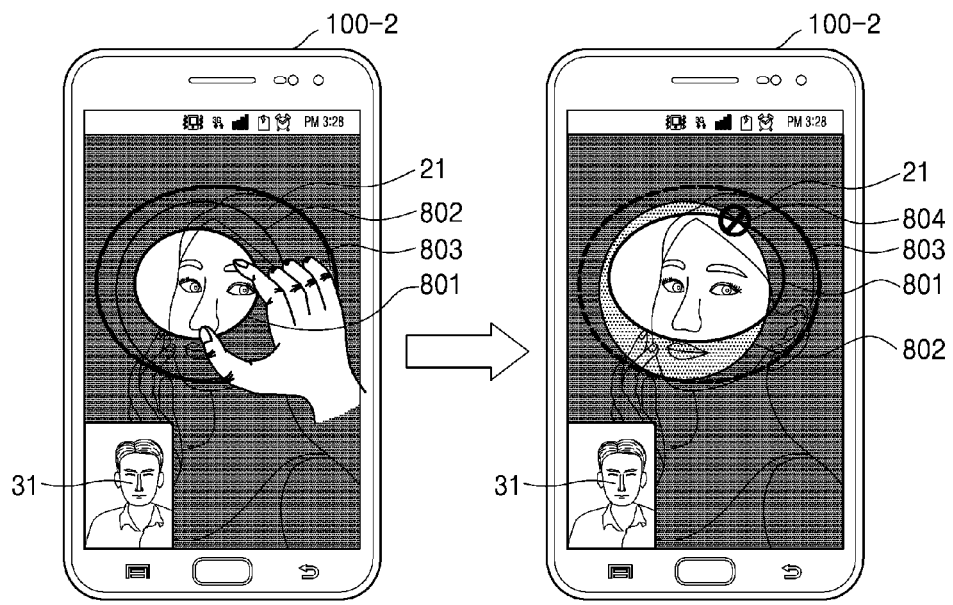
FIG. 8 is a diagram for describing a size of an exposure area controllable by a second terminal when a size of an exposure control area according to an input of a first user is smaller than a size of an exposure control area according to an input of a second user, according to an embodiment.

FIG. 8 is a diagram for describing a size of a first exposure area 801 controllable by the second terminal 100-2 when a size of an exposure control area according to an input of the first user 21 is smaller than a size of a second exposure control area 803 according to an input of the second user 31, according to an embodiment.

According to an embodiment, the second terminal 100-2 may control the size and location of the first exposure area

801 within a maximum first exposure area 802 having a smaller size among the maximum first exposure area 802 received from the first terminal 100-1 and the second exposure control area 803 input by the second user 31.

According to an embodiment, the second terminal 100-2 may control the size or location of the first exposure area 801 within a maximum size designated by the first terminal 100-1. According to an embodiment, the second terminal 100-2 may differently display an attribute of the maximum first exposure area 801 from attributes of an exposure area and non-exposure area. For example, a background color, opacity, texture, or a degree of modification of the maximum first exposure area 802 may be different from those of the first exposure area 801 and a non-exposure area.

According to an embodiment, the second user 31 may adjust the size of the first exposure area 801 via a pinching-up or pinching-down input, or adjust the location of the first exposure area 801 via a dragging input.

According to an embodiment, when an input of the second user 31 for controlling the first exposure area 801 exceeds the maximum first exposure area 802, a warning notification may be output. For example, the second terminal 100-2 may output a visual warning notification 804. According to an embodiment, the second terminal 100-2 may display that a control range of the first exposure area 801 is exceeded by using a popup message, a vibration notification, or a voice notification.

Figure 9:
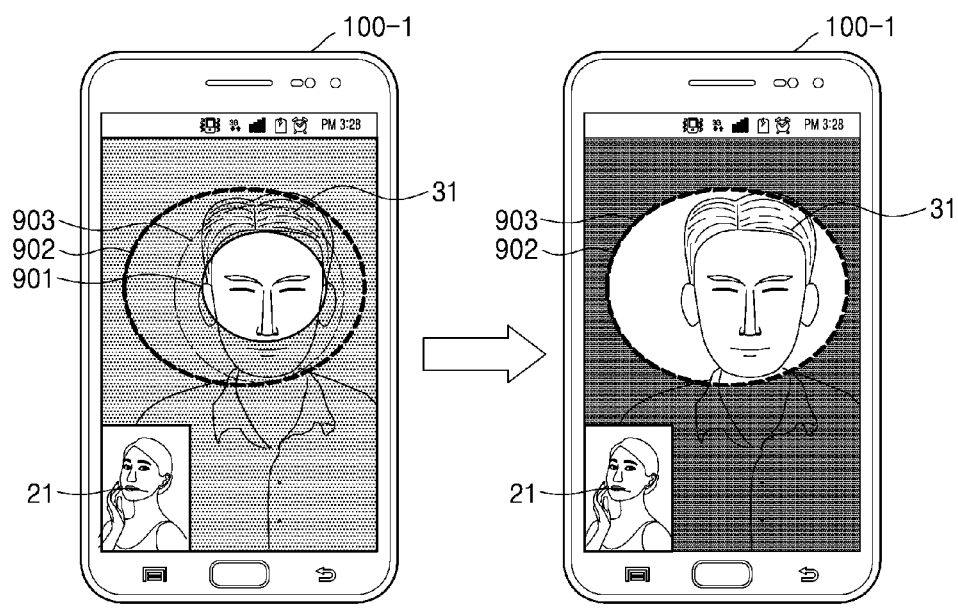
FIG. 9 is a diagram for describing a screen of a first terminal when a size of an exposure control area according to an input of a first user is the same as a size of an exposure control area according to an input of a second user, according to an embodiment.

FIG. 9 is a diagram for describing a video call screen of the first terminal 100-1 when a size of a first exposure control area 902 according to an input of the first user 21 is the same as a size of a maximum second exposure area 903 according to an input of the second user 31, according to an embodiment.

According to an embodiment, when the size of the first exposure control area 902 controlled by the first user 21 is the same as that of the maximum second exposure area 903 received from the second terminal 100-2, the first terminal 100-1 may output at least one of a visual notification, an auditory notification, and a tactile notification.

For example, when the size of the first exposure control area 902 is the same as that of the maximum second exposure area 903, the first terminal 100-1 may output an animation effect. For example, the first terminal 100-1 may output a message indicating that likability of the first and second users 21 and 31 are the same.

Alternatively, when the size of the first exposure control area 902 is the same as that of the maximum second exposure area 903, the first terminal 100-1 may match the locations of the first exposure control area 902 and maximum second exposure area 903. Also, when the size of the first exposure control area 902 is the same as that of the maximum second exposure area 903, the first terminal 100-1 may change a size of an exposure area 901 to the maximum second exposure area 903.

Accordingly, when the size of the first exposure control area 902 is the same as that of the maximum second exposure area 903, the first terminal 100-1 may display only one exposure area of the first exposure control area 902 and the maximum second exposure area 903 on the video call screen.

Figure 10:
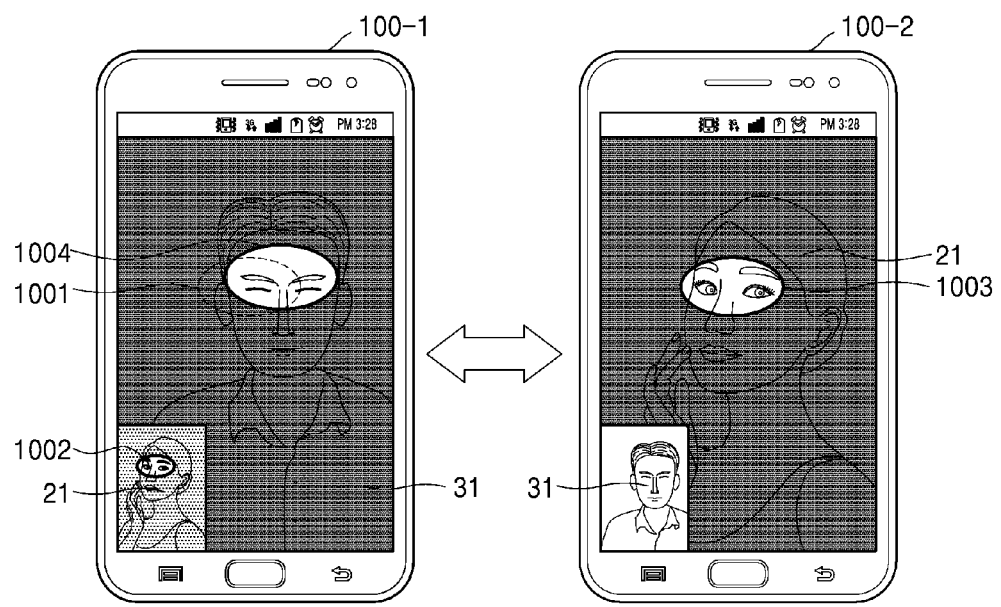
FIG. 10 is a diagram for describing displaying, on a first terminal, of an image corresponding to an image of a first user of a second terminal, according to an embodiment.

FIG. 10 is a diagram for describing displaying, on the first terminal 100-1, of an image corresponding to an image of the first user 21 of the second terminal 100-2, according to an embodiment.

According to an embodiment, the first terminal 100-1 may determine how the image of the first user 21 is displayed on the second terminal 100-2.

According to an embodiment, the first user 21 of the first terminal 100-1 may view an image of the second user 31 only through a second exposure area 1004. Also, the second user 31 of the second terminal 100-2 may view an image of the first user 21 only through a first exposure area 1003. According to an embodiment, the first user 21 may adjust the size and location of the first exposure area 1003 on the second terminal 100-2 by adjusting the size and location of a first exposure control area 1001.

According to an embodiment, the first terminal 100-1 may output, to a display of the first terminal 100-1, the image of the first user 21 obtained via a camera. According to an embodiment, the first terminal 100-1 may display a sub-exposure area 1002 corresponding to the first exposure area 1003 in the image of the first user 21 displayed on the display. According to an embodiment, the image of the first user 21 may be viewable only through the sub-exposure area 1002.

According to an embodiment, the first terminal 100-1 may adjust the size and location of the sub-exposure area 1002 based on adjusting of the size and location of the first exposure control area 1001. Accordingly, the first user 21 may estimate an exposure range of the image of the first user 21 displayed on the second terminal 100-2.

Figure 11:
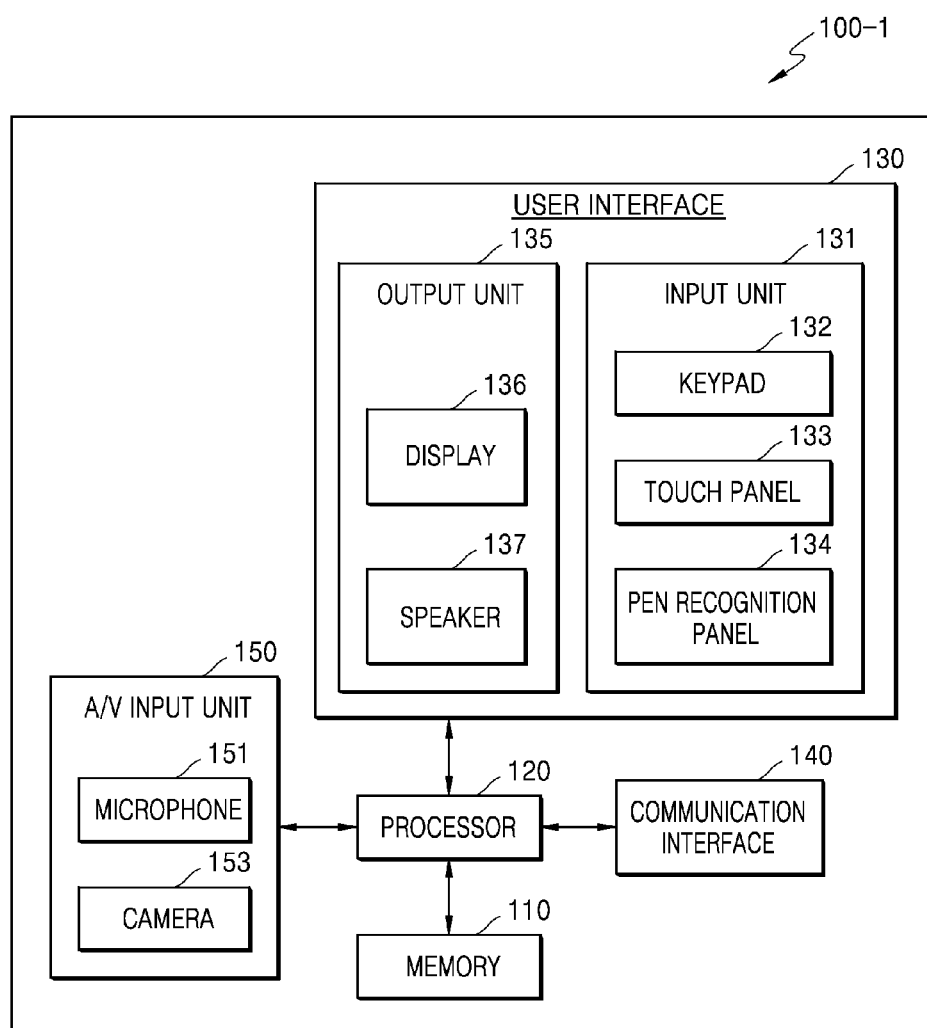
FIG. 11 is a block diagram of a configuration of a terminal, according to an embodiment.

FIG. 11 is a block diagram of a configuration of the first terminal 100-1, according to an embodiment.

FIG. 11 illustrates the first terminal 100-1, but according to an embodiment, the second terminal 100-2 may also have the same configuration of FIG. 11.

Referring to FIG. 11, the first terminal 100-1 may include a memory 110, a processor 120, a user interface 130, a communication interface 140, and an audio and video (A/V) input unit 150. It would be obvious to one of ordinary skill in the art that the first terminal 100-1 may further include a general-purpose component other than those shown in FIG. 11.

The memory 110 may store software or a program. For example, the memory 110 may store a program and various type of data, such as an application, an application programming interface (API), etc. The memory 110 may store instructions executable by the processor 120.

The processor 120 may execute instructions stored in the memory 110. The processor 120 may use various programs, content, and data stored in the memory 110, or store a new program, content, and data in the memory 110.

The processor 120 may access the memory 110 to perform booting by using an operating system (OS) stored in the memory 110. The processor 120 may perform various operations by using various programs, content, and data stored in the memory 110. For example, the processor 120 may display a certain screen on a display 136 by using various programs, content, and data stored in the memory 110. The processor 120 may perform a control operation corresponding to manipulation of a user when the user manipulates a region of the display 136.

The processor 120 may include a graphics processing unit (GPU) specialized for graphic processing. The GPU displays a user interface screen on a region of the display 136 when the first terminal 100-1 is booted. In particular, the GPU may generate a screen displaying a video call layout including various objects, such as content, an icon, and a menu. The GPU may calculate attribute values, such as a coordinate value, a shape, a size, and a color, of each object according to the video call layout. Then, the GPU may generate a screen having various layouts including the objects, based on the calculated attribute values. The screen generated by the GPU may be provided to the display 136 and displayed in each region of the display 136.

Meanwhile, the processor 120 may include a video processor and an audio processor. The processor 120 may control the video processor and the audio processor to process video data or audio data included in an image stream received through the communication interface 140 or an image stream stored in the memory 110.

The user interface 130 may include an input unit 131 and an output unit 135.

The input unit 131 may receive various instructions from a user. The input unit 131 may include at least one of a keypad 132, a touch panel 133, and a pen recognition panel 134.

The keypad 132 may include various types of keys, such as a mechanical button, wheels, etc. which are formed on various regions of the first terminal 100-1, such as a front surface, a side surface, a rear surface, etc. of an outer body.

The touch panel 133 may detect a touch input of the user and output a touch event value corresponding to the detected touch input. When the touch panel 133 is configured as a touch screen by being combined with a display panel, the touch screen may be embodied as various types of touch sensor, such as an electrostatic type, pressure-sensitive type, or a piezoelectric type.

The pen recognition panel 134 may detect a proximity input or touch input of a touch pen (for example, a stylus pen) according to the use of the user, and output a pen proximity event or a pen touch event. The pen recognition panel 134 may be embodied in, for example, an electromagnetic resonance (EMR) manner and may detect a touch or proximity input according to a change of intensity of an electromagnetic field caused by approaching or touching of the pen. The pen recognition panel 134 may include an electromagnetic induction coil sensor having a grid structure and an electronic signal processor configured to sequentially provide an alternating current (AC) signal having a certain frequency to loop coils of the electromagnetic induction coil sensor.

The output unit 135 may include the display 136 and a speaker 137.

The display 136 may include a display panel and a controller for controlling the display panel. The display panel may include a liquid crystal display (LCD), an organic light-emitting diode (OLED) display, an active-matrix organic light-emitting diode (AM-OLED) display, a plasma display panel (PDP), or the like. The display panel may be flexible or wearable. The display 136 may be provided as a touch screen by being combined with the touch panel 133 of the input unit 131.

The speaker 137 may output sound based on audio data. For example, the speaker 137 may output voice of the user according to audio data included in an image stream.

The communication interface 140 may communicate with various types of external devices according to various types of communication methods. The communication interface 140 may include at least one of a Wi-Fi chip, a Bluetooth chip, a near-filed communication (NFC) chip, and a wireless communication chip. The processor 120 may communicate with various external devices by using the communication interface 140.

The Wi-Fi chip and the Bluetooth chip may perform communication respectively via a Wi-Fi method and a Bluetooth method. When the Wi-Fi chip or Bluetooth chip is used, various types of connection information, such as a service set identifier (SSID), a session key, etc., are exchanged first to establish communication connection, and then various types of information may be exchanged. The NFC chip is a chip operating in a NFC manner using 13.56 MHz band among various RF-ID frequency bands. The wireless communication chip is a chip performing communication according to various communication standards, such as IEEE (Institute of Electrical and Electronics Engineers), Zigbee, 3G (3rd Generation), 3GPP (3rd Generation Partnership Project), LTE (Long Term Evolution), and 5G (5th Generation).

The A/V input unit 150 may include a microphone 151 and a camera 153. The microphone 151 may receive and convert user's voice or other sound to audio data. The processor 120 may use the user's voice input through the microphone 151 for a video call or convert and store, in the memory 110, the user's voice to audio data. The camera 153 may capture a still image or a moving image according to user's control. The camera 153 may be a camera module provided on a front or rear surface of the first terminal 100-1. The processor 120 may generate an image stream for a video call by using voice input through the microphone 151 and an image captured by the camera 153.

Meanwhile, the first terminal 100-1 may operate in a motion control mode or a voice control mode. When the first terminal 100-1 operates in the motion control mode, the processor 120 may capture an image of the user by activating the camera 153, track a motion change of the user, and perform a control operation corresponding to the motion change. When the first terminal 100-1 operates in the voice control mode, the processor 120 may analyze the user's voice input through the microphone 151 and perform a control operation according to the analyzed user's voice.

The names of the components of the first terminal 100-1 may vary. Also, the first terminal 100-1 according to an embodiment may include at least one of the above embodiments, may not include some of the embodiments, or may further include an additional component. The first terminal 100-1 may perform the above embodiments by using at least one of the above components.

Figure 12:
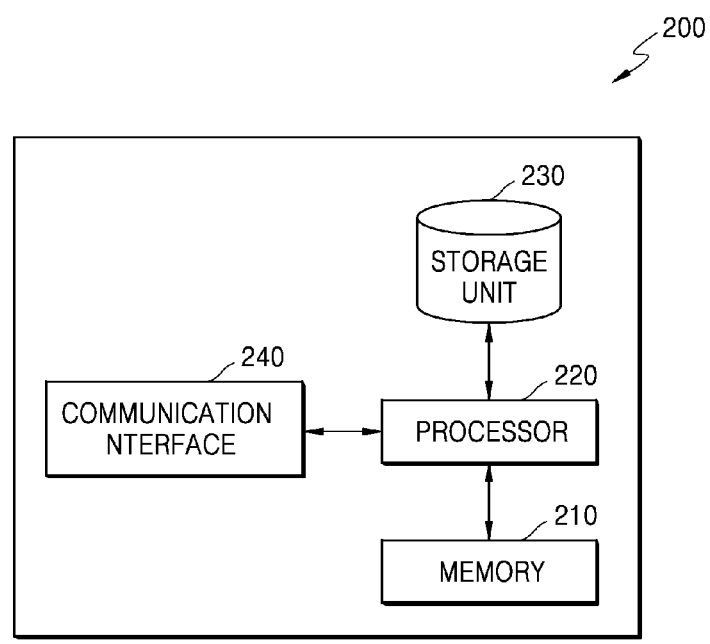
FIG. 12 is a block diagram of a configuration of a server for providing a video call service, according to an embodiment.

FIG. 12 is a block diagram of a configuration of the server 200 for providing a video call service, according to an embodiment.

Referring to FIG. 12, the server 200 for providing a video call service includes a memory 210, a processor 220, a storage unit 230, and a communication interface 240. It would be obvious to one of ordinary skill in the art that the server 200 may further include a general-purpose component other than those shown in FIG. 12. The components of FIG. 12 may be divided, combined, or omitted, or another component may be added, based on a configuration of the server 200. In other words, one component may be divided into at least two components, at least two components may be combined to one component, one component may be removed, or a new component may be added.

The memory 210 may store instructions executable by the processor 220. The memory 210 may store software or a program.

The processor 220 may execute instructions stored in the memory 210. The processor 220 may control the server 200 for providing a video call service in overall. The processor 220 may obtain information and a request received through the communication interface 240, and store the received information in the storage unit 230. Also, the processor 220 may process the received information. For example, the processor 220 may generate information used for the video call service from information received from the first terminal 100-1 or perform processing for managing received information, and store the information in the storage unit 230.

Also, in response to a request obtained a terminal, the processor 220 may use information stored in the storage unit 230 to transmit information for providing the video call service to the terminal through the communication interface 240.

The storage unit 230 may store various types of software and information necessary for the server 200 to provide the video call service. For example, the storage unit 230 may store a program and an application executed by the server 200, and various types of data used for the video call service.

The storage unit 230 may store and manage personal information of users using a video call service in a database. The storage unit 230 may store various types of information used for the video call service and personal information of users according to accounts for accessing the server 200.

The communication interface 240 may communicate with an external device including the first terminal 100-1. For example, the server 200 may receive, from the terminal, a request to start the video call service, a request for setting information for an environment of the video call service, etc., and in response to the request, provide all information related to the video call service.

Figure 13:
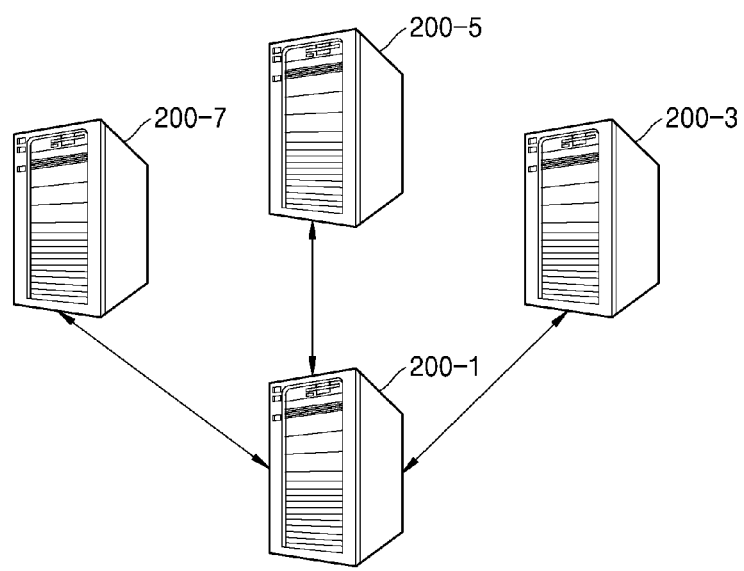
FIG. 13 is a diagram for describing a server for providing a video call service being implemented by a plurality of distributed servers, according to an embodiment.

FIG. 13 is a diagram for describing the server 200 for providing a video call service being implemented by a plurality of distributed servers, according to an embodiment.

Details that have been described above with reference to the server 200 will be applied to FIG. 13 even if omitted.

Referring to FIG. 13, the distributed servers may include a load distributed server 200-1 and functional servers 200-3, 200-5, and 200-7 providing a video call service. When a request related to a video call service is received from an external device, such as a terminal, the load distributed server 200-1 may determine and connect an arbitrary server among the functional servers 200-3 through 200-7 to the terminal, or may select and connect an optimum server among the functional servers 200-3 through 200-7 to the terminal by monitoring conditions of the functional servers 200-3 through 200-7.

Figure 14:
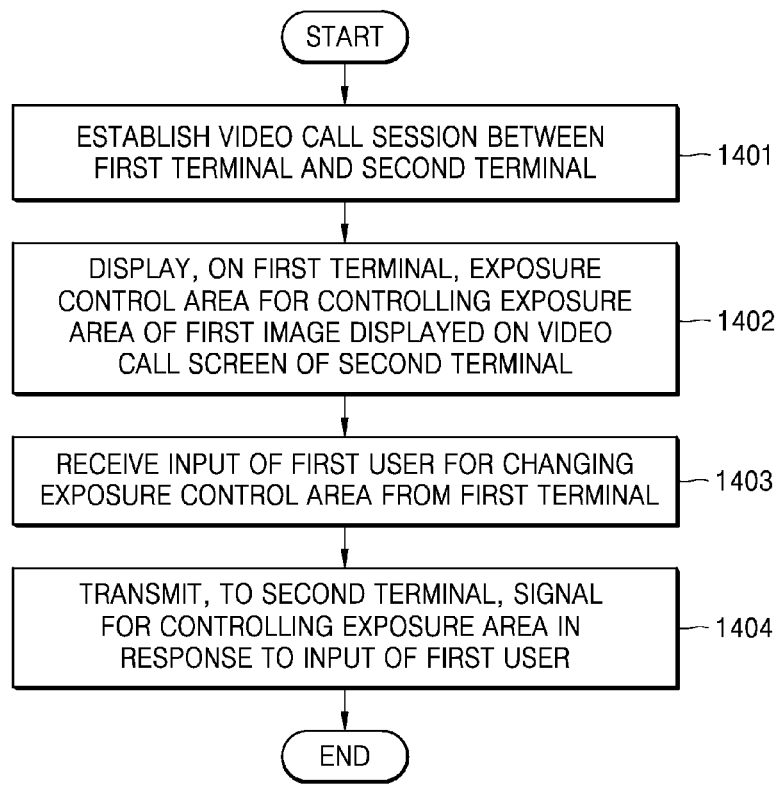
FIG. 14 is a flowchart of a method of providing a video call service, in which an exposure area according to an exposure control area is controlled, according to an embodiment.

FIG. 14 is a flowchart of a method of providing a video call service, in which an exposure area according to an exposure control area is controlled by the server 200, according to an embodiment.

In operation 1401, the server 200 may establish a video call session between the first and second terminals 100-1 and 100-2. According to an embodiment, the server 200 may receive a first image stream obtained by capturing an image of the first user 21 from the first terminal 100-1, and transmit the first image stream to the second terminal 100-2. According to an embodiment, the server 200 may receive a second image stream obtained by capturing an image of the second user 31 from the second terminal 100-2, and transmit the second image stream to the first terminal 100-1.

In operation 1402, the server 200 may display, on a video call screen of the first terminal 100-1, an exposure control area for controlling an exposure area of the image of the first user 21, the exposure area displayed on a video call screen of the second terminal 100-2.

According to an embodiment, the server 200 may hide a portion of the image of the first user 21 of the second terminal 100-2 such that the second user 31 views the image of the first user 21 only through the exposure area.

According to an embodiment, the server 200 may display the exposure control area at an arbitrary location on the video call screen of the first terminal 100-1. For example, the server 200 may display the exposure control area by using an arrow, a figure, an icon, or the like.

In operation 1403, the server 200 may receive an input of the first user 21 for changing the exposure control area, from the first terminal 100-1. According to an embodiment, at least one of a touching input, a dragging input, a pinching input, and a flicking input of the first user 21 may be received.

In operation 1404, the server 200 may transmit, to the second terminal 100-2, a signal for controlling the exposure area in response to the input of the first user 21. For example, when the input of the first user 21 is a pinching input for enlarging the exposure control area, the server 200 may transmit a signal for enlarging the exposure area to the second terminal 100-2. According to an embodiment, upon receiving the signal for enlarging the exposure area, the second terminal 100-2 may expose a larger range of the image of the first user 21. For example, when the second user 31 is able to view only a facial region of the first user 21, the second user 31 is then able to view up to a body region of the first user 21 according to enlargement of the exposure area.

Meanwhile, one or more embodiments related to the method of providing a video call service may be provided in the form of an application stored in a non-transitory computer-readable recording medium enabling the first or second terminal 100-1 or 100-2 to perform the method. In other words, the method may be provided in the form of an application or computer program stored in a non-transitory computer-readable recording medium enabling the first or second terminal 100-1 or 100-2 to perform each operation of the method.

Meanwhile, one or more embodiments described above may be embodied as computer-executable instructions and data on a non-transitory computer-readable recording medium. At least one of the instructions and data may be stored in a form of program code, and when executed by a processor, may generate a certain program module to perform a certain operation. Examples of the non-transitory computer-readable recording medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tape, a floppy disk, a magneto-optical data storage device, an optical data storage device, a hard disk, a solid-state disk (SSD), and any device capable of storing instructions or software, related data, a data file, and data structures and providing the instructions or software, the related data, the data file, and the data structures to a processor or a computer such that the processor or the computer may execute the instructions.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of providing a video call service in a terminal, the method comprising:
establishing a video call session between the terminal and an external terminal;

displaying an exposure control area for controlling an exposure area of an image of a first user displayed on the external terminal;

receiving an input of the first user for controlling the exposure control area; and transmitting a signal for controlling the exposure area to the external terminal in response to the input of the first user, wherein a size of the exposure area is adjusted based on an input of a second user of the external terminal within a maximum exposure area determined in response to an input of the first user.

2. The method of claim 1, wherein the method further comprises transmitting a signal for changing a size of the exposure area to the external terminal in response to an input of the first user for changing a size of the exposure control area.

3. The method of claim 1, wherein the method further comprises transmitting a signal for changing a location of the exposure area to the external terminal in response to an input of the first user for changing a location of the exposure control area.

4. The method of claim 1, wherein the method further comprises determining the maximum exposure area in response to an input of the first user for changing a size of the exposure control area.

5. The method of claim 4, wherein the method further comprises changing an attribute of an outline indicating a maximum size of the exposure area of the image of the first user upon receiving an input of the second user for adjusting the size of the exposure area of the image of the first user within the maximum exposure area.

6. The method of claim 4, wherein the method further comprises displaying a warning message upon receiving an input of the second user exceeding the maximum exposure area.

7. The method of claim 1, wherein the method further comprises:

receiving a signal for controlling a size of a second exposure area from the external terminal;

comparing a signal for controlling a size of a first exposure area input from the first user and the signal for controlling the size of the second exposure area to determine a signal in which a size to be controlled is smaller; and determining a maximum first exposure area and a maximum second exposure area, based on the determined signal, wherein the first exposure area is an exposure area of the image of the first user displayed on the external terminal and the second exposure area is an exposure area of an image of a second user displayed on the terminal.

8. The method of claim 7, wherein the method further comprises, upon receiving the signal for controlling the size of the second exposure area from the external terminal, displaying a second exposure control area corresponding to the received signal, wherein the second exposure control area is controlled according to an input of the second user through the external terminal.

9. The method of claim 8, wherein the method further comprises:

simultaneously displaying a first exposure control area and the second exposure control area; and outputting at least one of a visual notification, an auditory notification, and a tactile notification when at least one of sizes, locations and shapes of the first exposure control area and the second exposure control area match each other, wherein the first exposure control area is controlled according to an input of the first user.

10. The method of claim 1, wherein the method further comprises, upon receiving the input of the first user of changing the exposure control area, displaying an exposure area corresponding to the exposure control area on the image of the first user displayed on the terminal.

11. The method of claim 1, wherein the method further comprises:

receiving a user input of changing at least one of an attribute of a voice signal received by the terminal and an attribute of a voice signal transmitted to the external terminal; and changing the attribute of the voice signal based on the user input.

12. The method of claim 1, wherein the exposure area is an area fixed at a pre-set location of the image of the first user displayed on the external terminal.

13. The method of claim 1, wherein the exposure area tracks a part of a body of the first user included in the image of the first user displayed on the external terminal.

14. The method of claim 1, wherein the method further comprises visualizing a shape of the exposure control area based on a user input of requesting control of the exposure control area.

15. A method of providing a video call service in a terminal, the method comprising:

establishing a video call session between the terminal and an external terminal;

displaying an exposure control area for controlling an exposure area of an image of a first user displayed on the external terminal;

receiving an input of the first user for controlling the exposure control area;

transmitting a signal for controlling the exposure area to the external terminal in response to the input of the first user;

adjusting a size of the exposure area of an image of a second user displayed on the terminal according to an input of the first user, within a pre-set maximum exposure area, and displaying a range for adjusting the size of the exposure area of the image of the second user in response to the input of the first user.

16. A method of providing a video call service in a terminal, the method comprising:

establishing a video call session between the terminal and an external terminal;

displaying an exposure control area for controlling an exposure area of an image of a first user displayed on the external terminal;

receiving an input of the first user for controlling the exposure control area;

transmitting a signal for controlling the exposure area to the external terminal in response to the input of the first user receiving a user input of changing an attribute of a non-exposure area excluding the exposure area of the image of the first user displayed on the external terminal; and transmitting a signal of changing the attribute of the non-exposure area to the external terminal, based on the user input.

17. A terminal comprising:
- a communication interface configured to communicate with an external terminal for providing a video call service;
- a user interface;
- an audio and video input unit;
- a processor; and
- a memory storing instructions executable by the processor,
- wherein the processor is configured to execute the instructions to:
- control the communication interface to establish a video call session between the terminal and the external terminal;
- control the user interface to display an exposure control area for controlling an exposure area of an image of a first user displayed on the external terminal;
- control the user interface to receive an input of the first user for controlling the exposure control area; and
- control the communication interface to transmit a signal for controlling the exposure area to the external terminal in response to the input of the first user,
- wherein a size of the exposure area is adjusted based on an input of a second user of the external terminal within a maximum exposure area determined in response to an input of the first user.

* * * * *